(12) United States Patent
Chen et al.

(10) Patent No.: US 7,304,864 B2
(45) Date of Patent: Dec. 4, 2007

(54) LATCHING ASSEMBLY FOR A REMOVABLE PANEL OF A PORTABLE ELECTRONIC DEVICE

(75) Inventors: Rui-Hao Chen, Shenzhen (CN); Chia-Hua Chen, Tu-Cheng (TW)

(73) Assignees: Shenzhen Futaihong Precision Industrial Co., Ltd., Shenzhen, Guangdong Province (CN); Sutech Trading Limited, Tortola (VG)

( * ) Notice: Subject to any disclaimer, the term of this patent is extended or adjusted under 35 U.S.C. 154(b) by 295 days.

(21) Appl. No.: 10/949,493

(22) Filed: Sep. 24, 2004

(65) Prior Publication Data
US 2005/0146860 A1    Jul. 7, 2005

(30) Foreign Application Priority Data
Jan. 6, 2004    (TW) .............................. 93200162 U

(51) Int. Cl.
*H04B 1/03* (2006.01)
(52) U.S. Cl. ...................................... 361/815
(58) Field of Classification Search ............... 361/815, 361/801
See application file for complete search history.

(56) References Cited

U.S. PATENT DOCUMENTS

2005/0141210 A1*  6/2005  Liu et al. ................... 361/801
2005/0146860 A1*  7/2005  Chen et al. ................. 361/815

* cited by examiner

*Primary Examiner*—Dean A. Reichard
*Assistant Examiner*—Abiy Getachew
(74) *Attorney, Agent, or Firm*—Morris Manning Martin LLP; Tim Tingkang Xia, Esq.

(57) ABSTRACT

A portable electronic device (100) includes a base cover (12), a latching assembly (13) including a knob (14) and a spring (16), and a removable panel (18). The knob includes a sliding slit (1462a) and a latching projection (1452). The panel includes a latching hole (185) and a resisting protrusion (1852). The knob is engagable in the latching hole. The knob is attached on the base cover and can be rotated. One end of the spring biases the knob, and another end of the spring protrudes out of the sliding slit and biases the base cover. When the panel is attached on the base cover, the resisting protrusion and the latching projection interfere with each other to drive the knob to rotate in a first direction, the spring rebounds and drives the knob to rotate in an opposite second direction, and the resisting protrusion is secured below the latching projection.

22 Claims, 6 Drawing Sheets

LATCHING ASSEMBLY FOR A REMOVABLE PANEL OF A PORTABLE ELECTRONIC DEVICE

BACKGROUND OF THE INVENTION

1. Field of the Invention

The present invention generally relates to portable electronic devices having removable panels, and more particularly to a latching assembly for detachably securing a removable panel to a portable electronic device.

2. Prior Art

Nowadays, portable electronic devices such as mobile phones and PDAs (personal digital assistants) are in widespread use around the world. There is more and more demand for higher quality and serviceability of these portable electronic devices. Many portable electronic devices are provided with removable panels that can be changed over for new, more aesthetically pleasing panels when so desired by users.

Removable panels are most commonly provided for mobile phones. A user may from time to time want to remove an old panel from a base cover of the mobile phone, and install a new fashionable panel on the base cover instead. The new panel must be attached firmly and securely.

Currently, removable panels of portable electronic devices are commonly fixed on the base covers by means of structures integrated with the panels themselves. An example is the removable panel of the mobile phone model No. OT310 marketed by ALCATEL CORPORATION. A top of the removable panel is bent to define a holding portion, and a hook protrudes from an inner surface of the holding portion. The removable panel has a peripheral flange. A bottom of the removable panel has two projections, and opposite sides of the removable panel have a plurality of detents. The projections and the detents protrude from the flange. Corresponding to the structure of the removable panel, the base cover has an engaging surface, and defines a notch, two grooves and a plurality of slits. The notch is located at a top of the engaging surface. The grooves are located at a bottom of the engaging surface. The slits are located at two opposite sides of the engaging surface. In assembly, the projections are firstly inserted into the grooves and retained therein. The hook is then inserted into the notch, with the detents being received in the slits. The hook is firmly engaged in the notch, and the detents are securely engaged in the slits. Thus the removable panel is firmly fixed to the base cover. In disassembly, the hook is first disengaged from the notch, with the detents being removed from the slits. The projections are then pulled out from the grooves. The removable panel is thus fully detached from the base cover.

It is important for the removable panel to not only be firmly retained in the base cover, but also to be easily removed when needed. Generally, a good deal of force needs to be exerted on the removable panel for it to be detached. The removable panel is easily damaged if excessive force is applied, both in the process of detaching the removable panel and also in attaching the removable panel.

A new latching assembly for a removable panel of a portable electronic device is desired in order to overcome the above-described problems.

SUMMARY OF THE INVENTION

Accordingly, an object of the present invention is to provide a latching assembly for a removable panel of a portable electronic device. In particular, a latching assembly which has a relatively simple configuration, which can firmly attach the removable panel to a base cover of the portable electronic device, and which can allow easy detachment of the removable panel from the base cover.

To achieve the above-mentioned object, a portable electronic device of the present invention includes a base cover, a latching assembly and a removable panel. The latching assembly comprises a knob and a spring. The knob comprises a sliding slit and a latching projection. The removable panel comprises a latching hole and a resisting protrusion. The knob is removably engagable in the latching hole. The resisting protrusion is detachably engagable with the latching projection. The knob is attached on the base cover and can be rotated relative to the base cover. One end of the spring biases the knob, and another end of the spring protrudes out of the sliding slit and biases the base cover. When the removable panel is attached on the base cover, the resisting protrusion of the base cover and the latching projection interfere with each other to drive the knob rotate in a first direction, the spring rebounds and drives the knob to rotate in a second direction opposite to the first direction, and the resisting protrusion is secured below the latching projection.

Other objects, advantages and novel features of the invention will become more apparent from the following detailed description when taken in conjunction with the accompanying drawings, in which:

DETAILED DESCRIPTION OF THE INVENTION

Figure 1:
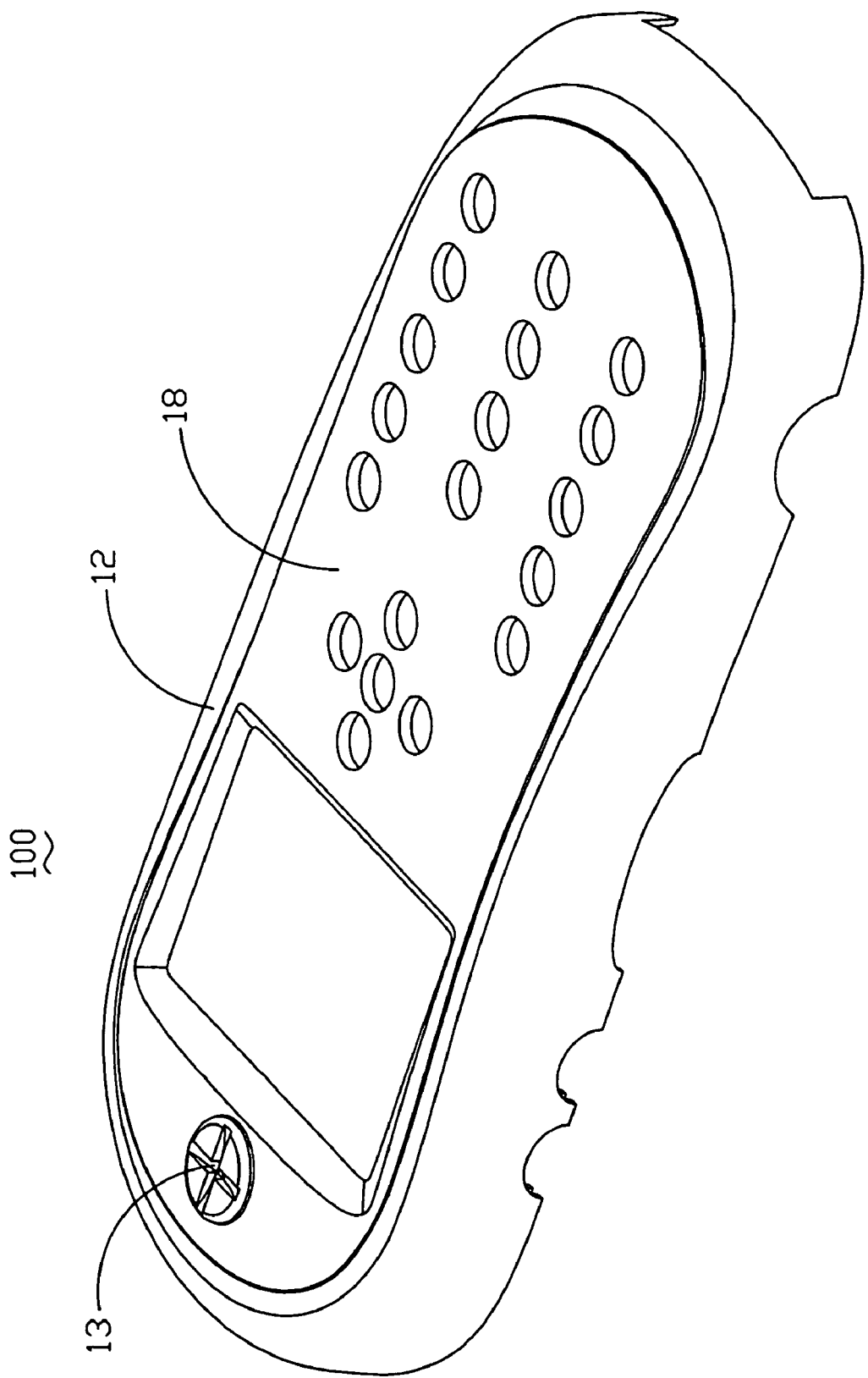
FIG. 1 is an isometric view of part of a portable electronic device, showing a removable panel, a base cover and a latching assembly in accordance with a first preferred embodiment of the present invention.

A portable electronic device of the present invention is generally shown in FIG. 1 to be a radiotelephone, preferably a cellular telephone operable in a cellular telephone system. Although the radiotelephone is provided as an exemplary embodiment, one skilled in the art will recognize that the features discussed hereinbelow will also find application in other portable electronic devices such as cordless telephones, wireline telephones, personal digital assistants ("PDAs"), two-way radios, pagers, and the like. Therefore, the radiotelephone as described herein shall be construed to include and refer to each and any of these portable electronic devices and their equivalents.

Figure 2:
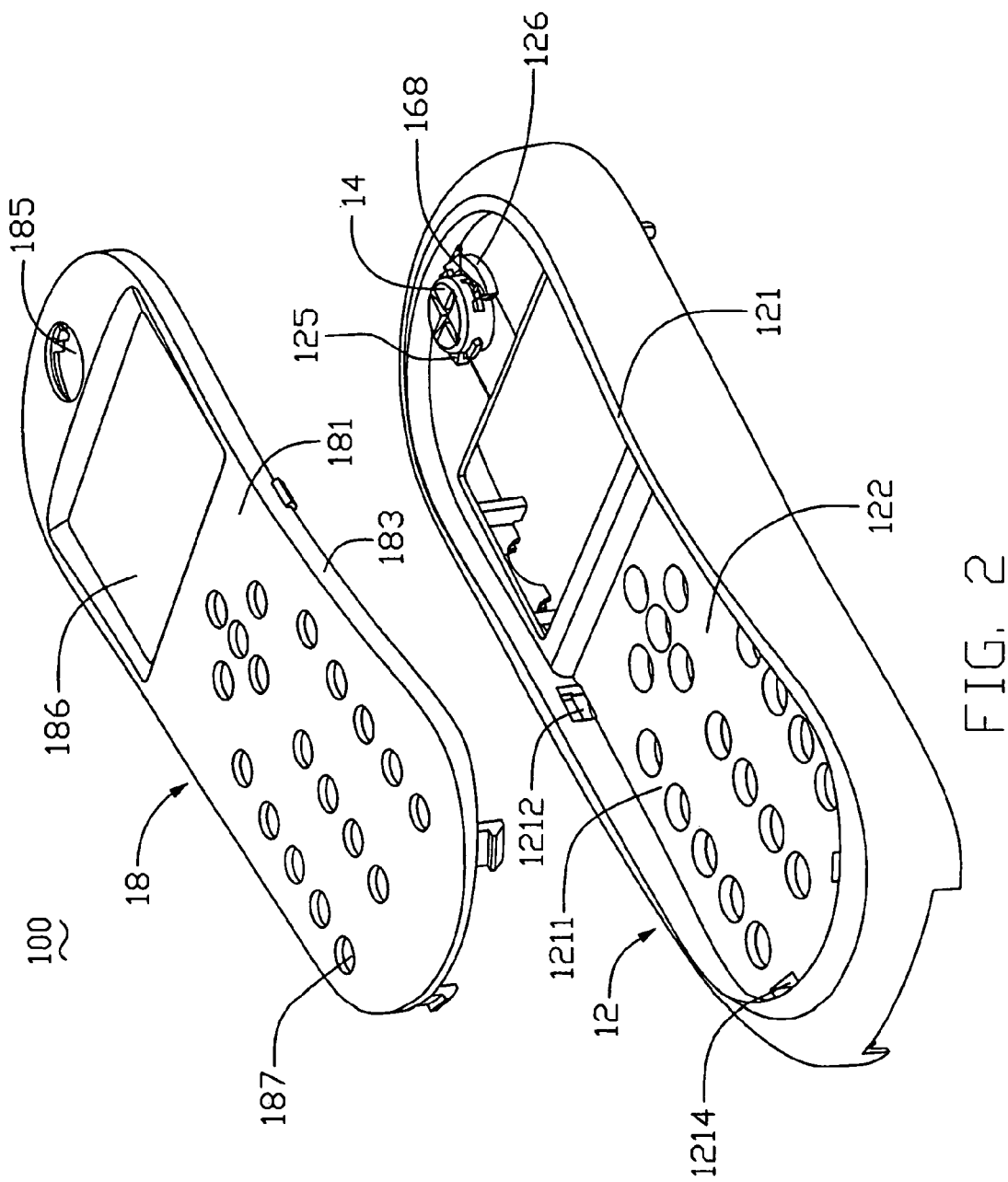
FIG. 2 is an exploded view of FIG. 1, but viewed from another aspect.

Referring to FIG. 1 and FIG. 2, a radiotelephone 100 of a first preferred embodiment includes a base cover 12, a latching assembly 13 and a removable panel 18. The latching assembly 13 comprises a knob 14 and a spring 16 (see FIG. 3). The spring 16 is assembled in the knob 14. The removable panel 18 is inserted in the base cover 12 and firmly retained therein by way of the latching assembly 13. It is to be understood that the position of the latching assembly 13 can be varied to any other suitable location on the radiotelephone or on a portable electronic device.

Figure 3:
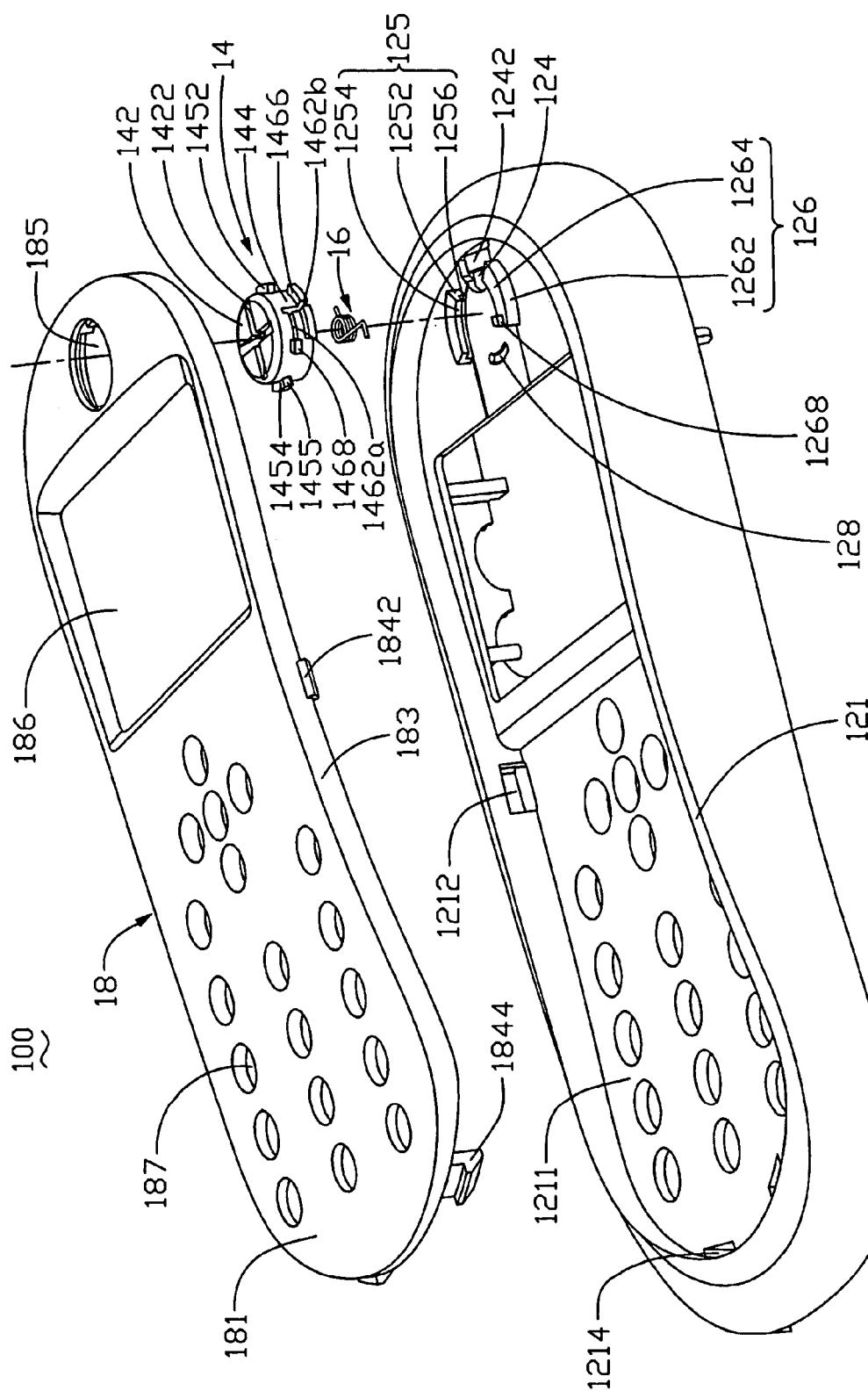
FIG. 3 is a further exploded view of FIG. 2.

Referring also to FIG. 3, the base cover 12 includes a peripheral sidewall 121, a bottom wall 122, and a lower surface 123 (see FIG. 4) to commonly defining a receiving space between them. The sidewall 121 and the bottom wall 122 cooperatively form a shallow compartment 1211 in an upper portion of the base cover 12. The bottom wall 122 defines a hole 124 in a first end portion thereof. Two elastic plates 1242 as a flexible element symmetrically extend upwardly from opposite sidewalls bounding the hole 124. Each elastic plate 1242 slants obliquely upwardly from the bottom wall 122. The elastic plate 1242 is made of flexible material and can be pressed down repeatedly. That is, the elastic plate 1242 can undergo elastic deformation when an external force is applied thereto, and can restore to its original state when the external force is removed. An arcuate first guiding support 125 and an arcuate second guiding support 126 are disposed on the bottom wall 122 adjacent opposite sides of the hole 124 respectively. The first guiding support 125 and the second guiding support 126 are aligned along the perimeter of a same circle. The first guiding support 125 includes a first sidewall 1252, and an arcuate first block 1254 extending from the first sidewall 1252 toward a center of the circle. The first block 1254 and the bottom wall 122 cooperatively define a first sliding groove 1256 therebetween, for slidably receiving part of the knob 14. The second guiding support 126 includes a second sidewall 1262, and an arcuate second block 1264 extending from the second sidewall 1262 toward the center of the circle. The second block 1264 and the bottom wall 122 cooperatively define a second sliding groove (not labeled) therebetween, for slidably receiving another part of the knob 14. A securing projection 1268 protrudes upwardly from one end of the second sidewall 1262 of the second guiding support 126, for resisting the spring 16. The bottom wall 122 defines an arcuate guiding groove 128 adjacent ends of the guiding supports 125, 126, and being opposite to the hole 124. The guiding groove 128 is aligned along the perimeter of the circle.

A pair of catch slots 1212 is defined in opposite long side portions of the sidewall 121 respectively. Two latching slots 1214 as a engaging mechanism are defined in a second end portion of the bottom wall 122, the second end portion being opposite from the first end portion. It is to be understood that the number of catch slots 1212 and the number of latching slots 1214 can be varied according to need.

Figure 4:
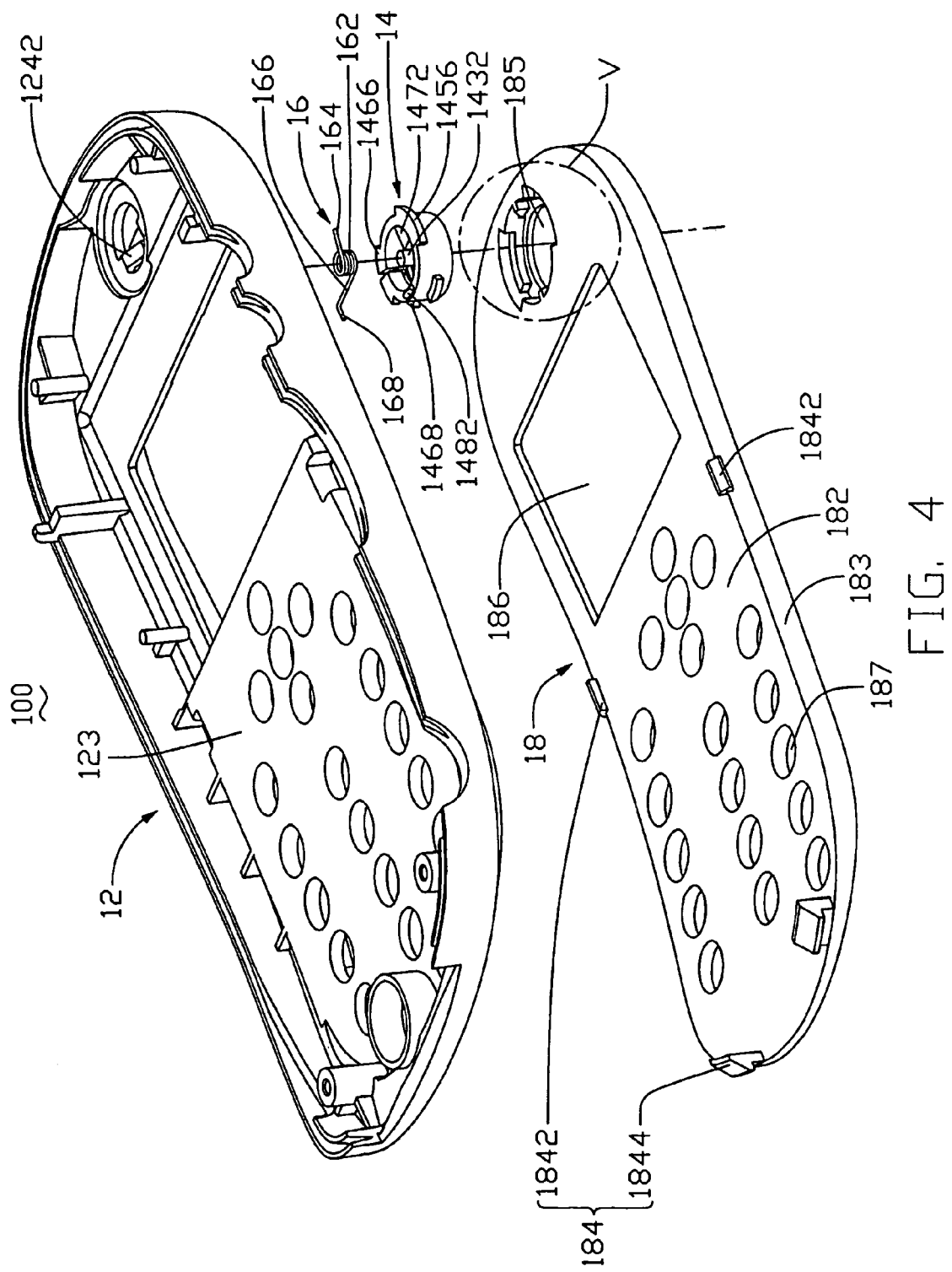
FIG. 4 is similar to FIG. 3, but viewed from an underside aspect.
Figure 6:
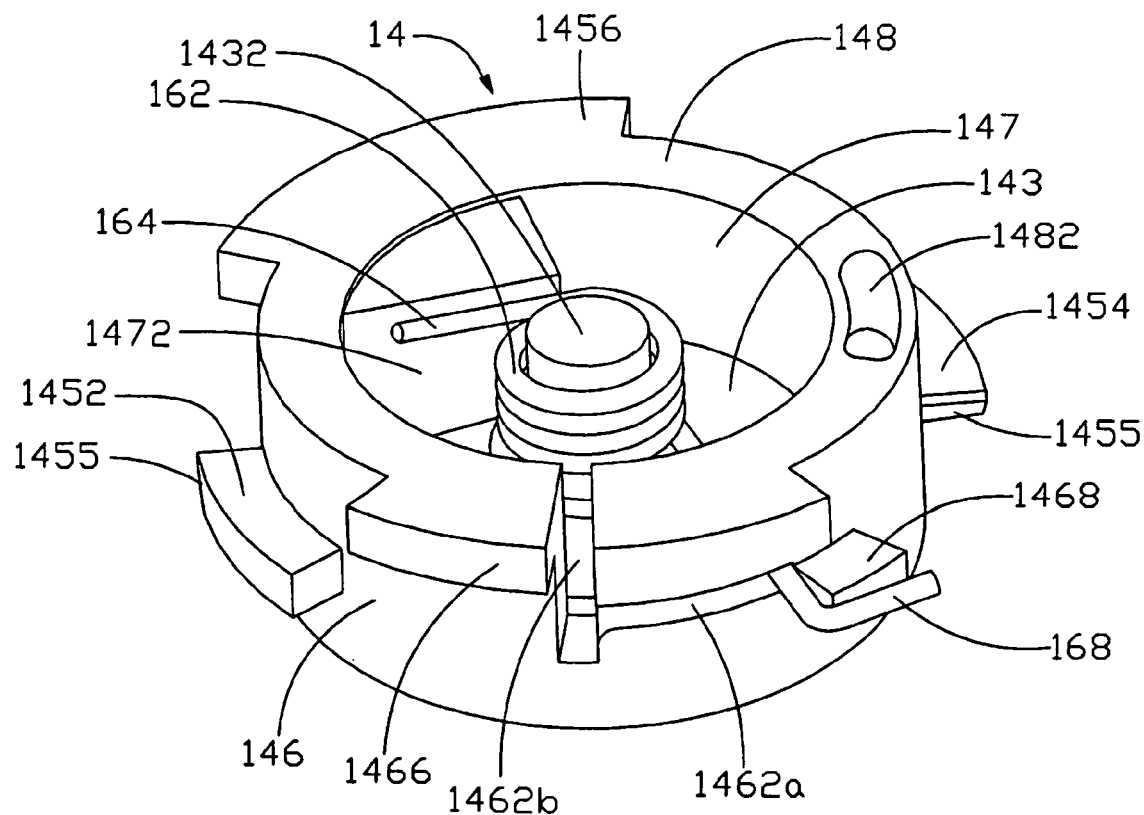
FIG. 6 is an enlarged view of a knob and a spring of the latching assembly of FIG. 1, but viewed from an underside aspect.

Referring also to FIG. 4 and FIG. 6, the knob 14 is generally cylindrical, and includes a circular top wall 142 and a circumferential sidewall 144. The top wall 142 has an outer surface (not labeled) and an inner surface 143. The top wall 142 defines a cross-shaped groove 1422 in an uppermost part thereof, for facilitating operation. A columnar positioning post 1432 extends downwardly from a center of the inner surface 143. The sidewall 144 includes an outer surface 146, an inner surface 147, and a bottom surface 148. A first rotating projection 1456 and a second rotating projection 1466 extended radially outwardly from the outer surface 146 at the bottom surface 148. The first rotating projection 1456 and the second rotating projection 1466 are respectively engaged in the first sliding groove 1256 and the second sliding groove. A resisting projection 1468 is formed on the outer surface 146, at a predetermined distance from the second rotating projection 1466. A first latching projection 1452 and a second latching projection 1454 are formed on the outer surface 146, being respectively located between the first rotating projection 1456 and the second rotating projection 1466. The first latching projection 1452 and the second latching projection 1454 each include a fixing incline 1455. A resisting block 1472 is formed on the inner surface 147, for resisting the spring 16. The resisting block 1472 is generally opposite to the resisting projection 1468. A guiding projection 1482 is formed on the bottom surface 148, corresponding to the guiding groove 128 of the base cover 12. The guiding projection 1482 is sized so that it can smoothly slide within the guiding groove 128. The sidewall 144 defines an arcuate sliding slit 1462a parallel to the second rotating projection 1466, and a straight receiving slit 1462b perpendicular to the circular sliding slit 1462a. The sliding slit 1462a spans from the resisting projection 1468 to communicate with the receiving slit 1462b. A length of the sliding slit 1462a is adapted to facilitate rotation of the knob 14.

Referring particularly to FIG. 3 and FIG. 4, the spring 16 is a torque spring. The spring 16 includes a spring body 162, a first fixing portion 164 extending tangentially from one end of the body 162, and a second fixing portion 166 extending tangentially from an opposite end of the body 162. The second fixing portion 166 is perpendicular to the first fixing portion 164. The second fixing portion 166 includes a bent portion 168 at a distal end thereof.

The removable panel 18 comprises an upper surface 181, a lower surface 182, a peripheral side surface 183, and a plurality of detents 184 protruding from a peripheral edge portion thereof. The removable panel 18 further defines a latching hole 185 in a first end portion thereof, a display window 186 adjacent the latching hole 185, and a plurality of keyholes 187 adjacent the display window 181. The detents 184 include a pair of catches 1842 and a pair of latches 1844. The catches 1842 are located on opposite long portions of the side surface 183 respectively, and correspond to the catch slots 1212 of the base cover 10. The latches 1844 are located on a second end portion of the removable panel 18, the second end portion being opposite from the first end portion. The latches 1844 correspond to the latch slots 1214 of the base cover 10. It is to be understood that the number of catches 1842 and the number of latches 1844 can be varied according to need.

Figure 5:
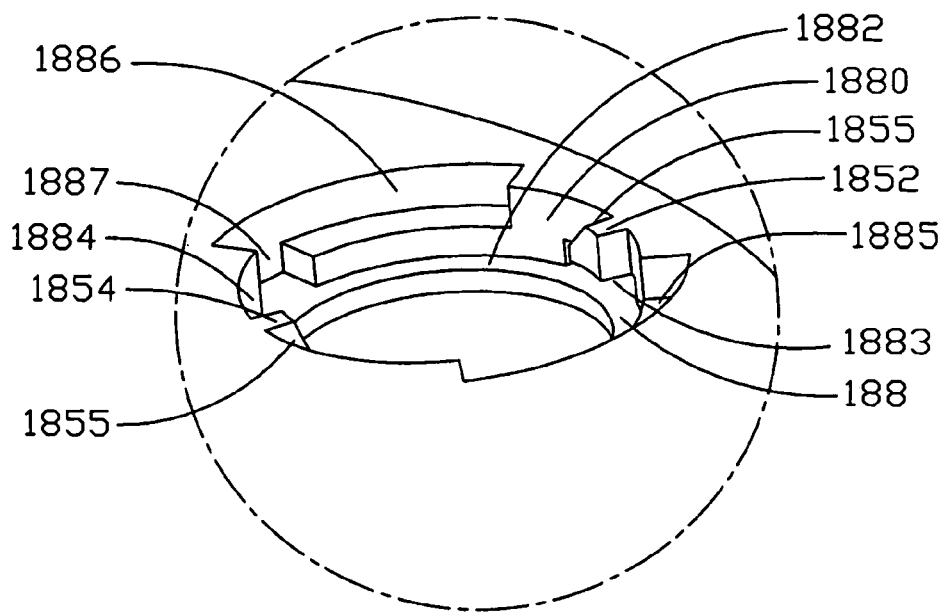
FIG. 5 is an enlarged view of a circled portion V of FIG. 4.

Referring also to FIG. 5, the lower surface 182 defines a receiving groove 188 for receiving portion of the knob 14. The receiving groove 188 is bounded by a sidewall 1880 and a bottom wall 1882. The sidewall 1880 forms a first resisting protrusion 1852 corresponding to the first latching projection 1452, and a second resisting protrusion 1854 corresponding to the second latching projection 1454. The first resisting protrusion 1852 and the second resisting protrusion 1854 each have a resisting incline 1855, the resisting inclines 1855 corresponding to the fixing inclines 1455. The bottom wall 1882, the sidewall 1880 and the resisting protrusions 1852, 1854 cooperatively define a first fixing groove 1883 and a second fixing groove 1884, for receiving the first latching projection 1452 and the second latching projection 1454 respectively. The sidewall 1880 defines a first rotating groove 1885 corresponding to the first guiding support 125, and a second rotating groove 1886 corresponding to the second guiding support 126. The first rotating groove 1885 and the second rotating groove 1886 are sized so that the first guiding support 125 and the second guiding support 126 can respectively smoothly rotate therewithin.

The sidewall 1880 defines a receiving aperture 1887 adjacent the second rotating groove 1886, corresponding to the securing projection 1268.

Referring to FIG. 6, in assembly, firstly, the spring body 162 of the spring 16 is placed around the positioning post 1432. The first fixing portion 164 biases against one side of the resisting block 1472. The second fixing portion 166 is inserted into the receiving slit 1462b and slid into the sliding slit 1462a. The bent portion 168 biases against the resisting projection 1468. The spring is thus attached to the knob 14. Referring to FIG. 2, secondly, the knob 14 is attached to the base cover 12 as follows. The knob 14 is placed on a first end portion of the base cover 12 at the guiding groove 128, opposite from the elastic plate 1242. The first rotating projection 1456 and the second rotating projection 1466 are aligned with the first sliding groove 1256 and the second sliding groove respectively. The knob 14 is pushed toward the elastic plate 1242 to make the first rotating projection 1456 and the second rotating projection 1466 respectively slide into the first sliding groove 1256 and the second sliding groove until the guiding projection 1482 is engaged in the guiding groove 128. At this time, the first latching projection 1452 is located above the elastic plates 1242, and the elastic plates 1242 are in their original states. The bent portion 168 is moved to bias against the securing projection 1268 of the second guiding support 126.

Referring also to FIG. 1, thirdly, the removable panel 18 is attached to the combined base cover 12 and knob 14 as follows. The latches 1844 of the removable panel 18 are inserted into the latch slots 1214 of the base cover 12. The catches 1842 are received in the catch slots 1212. The latching hole 185 receives portion of the knob 14. The resisting inclines 1855 of the first and second resisting protrusions 1852, 1854 at the lower surface 182 of the removable panel 18 resist against the fixing inclines 1455 of the first and second latching projections 1452, 1454. The first end portion of the removable panel 18 is pressed down, and interference between the resisting inclines 1855 and the fixing inclines 1455 makes the knob 14 rotate clockwise. The spring 16 is thereby twisted and accumulates potential energy because of the resistance of the securing projection 1268. The removable panel 18 travels down and presses the elastic plates 1242 down to horizontal positions. The first and second latching projections 1452, 1454 contact the bottom wall 1882 in the receiving groove 188, and are aligned with the first and second fixing grooves 1883, 1884. Further, the first and second guiding supports 125, 126 are respectively received in the first and second rotating grooves 1885, 1886, and the securing projection 1268 is received in the receiving aperture 1887. The spring 16 immediately recovers and drives the knob 14 anti-clockwise. The first and second latching projections 1452, 1454 thereby slide into the first and second fixing grooves 1883, 1884 respectively. The removable panel 18 is thus removably attached on the base cover 12 by the knob 14, with the top wall 142 being exposed out of the latching hole 185 above the upper surface 181.

In detaching the removable panel 18 from the base cover 12, the process is substantially the reverse of the above-described assembly process. The knob 14 is rotated clockwise so that the first and second latching projections 1452, 1454 exit the first and second fixing grooves 1883, 1884. The elastic plates 1242 immediately recover and push the removable panel 18 upwardly. Thus the removable panel 18 is displaced upwardly, with the bottom wall 1882 moving up and away from the first and second latching projections 1452, 1454. Then the removable panel 18 can be gripped in order to take it out from the compartment 1211. Further or alternatively, the radiotelephone can be inverted in order to take the removable panel 18 out from the compartment 1211. The catches 1842 of the removable panel 18 are released from the catch slots 1212 of the base cover 12, and the latches 1844 of the removable panel 18 are released from the latching slots 1212 of the base cover 12.

Figure 7:
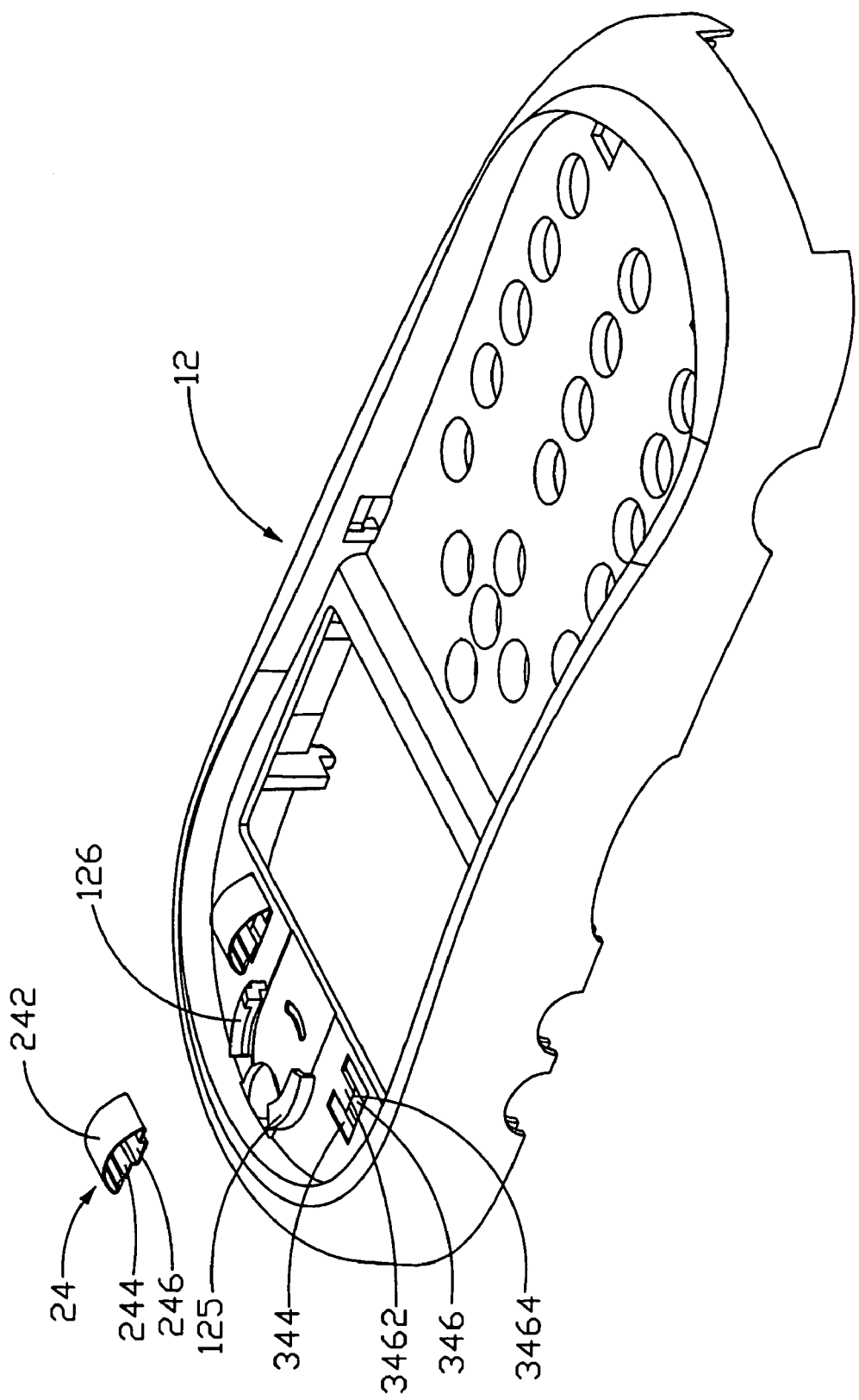
FIG. 7 is an isometric view of a base cover in accordance with a second preferred embodiment of the present invention.

Referring to FIG. 7, in a second preferred embodiment, two elastic plates 24 are removably attached on the base cover 12. Each elastic plate 24 is made of a flexible metallic material. The elastic plate 24 comprises an arcuate elastic portion 242 and a fixing portion 244. The fixing portion 244 comprises a medial recessed portion 246. The base cover 12 defines two mounting portions 344 in respective opposite sides of the first end portion thereof. The mounting portions 344 are located adjacent opposite sides of the first and second guiding supports 125, 126 respectively. Each mounting portion 344 defines a latching hole 346, for engagingly receiving the recessed portion 246 of a corresponding elastic plate 24. A latching plate 3462 extends into the latching hole 346. An incline 3464 is formed at a distal end of the latching plate 3462, for facilitating engagement of the corresponding elastic plate 24 in the latching hole 346. In assembly, the recessed portions 246 are inserted into the latching holes 346, and engaged therein by the latching plates 3462. The elastic plates 24 are thus attached to the mounting portions 344. In this second preferred embodiment, the processes of assembly and detaching of the removable panel 18 are substantially the same as those described above in relation to the first preferred embodiment.

From the above description, it will be apparent that the knob 14 and the spring 16 of the present invention provide convenient attachment and detachment of the removable panel 18 to and from the base cover 12.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A portable electronic device, comprising:
   a base cover;
   a latching assembly comprising a knob and a spring, the knob comprising a sliding slit and a latching projection; and
   a removable panel comprising a latching hole and a resisting protrusion, the knob being removably engagable in the latching hole, the resisting protrusion being detachably engagable with the latching projection;
   wherein the knob is attached on the base cover and can be rotated relative to the base cover, one end of the spring biases the knob and another end of the spring protrudes out of the sliding slit and biases the base cover; and
   when the removable panel is attached on the base cover, the resisting protrusion of the base cover and the latching projection interfere with each other to drive the knob to rotate in a first direction, the spring rebounds and drives the knob to rotate in a second direction opposite to the first direction, and the resisting protrusion is secured below the latching projection.

2. The portable electronic device as claimed in claim 1, wherein the base cover includes a bottom wall and a peripheral sidewall, and the bottom wall and the peripheral sidewall cooperatively form a shallow compartment in an upper portion of the base cover for receiving the removable panel.

3. The portable electronic device as claimed in claim 2, wherein the bottom wall defines a hole in one end thereof, and at least one elastic plate extends upwardly from a sidewall bounding the hole.

4. The portable electronic device as claimed in claim 3, wherein a guiding support is formed adjacent to a side of the hole, and the guiding support includes a sidewall and a block extending from the sidewall.

5. The portable electronic device as claimed in claim 4, wherein a securing projection extends upwardly from one end of the guiding support, for resisting the spring.

6. The portable electronic device as claimed in claim 5, wherein the block of the guiding support is arcuate, the bottom wall defines an arcuate guiding groove adjacent to the guiding support, and the guiding groove is aligned along the perimeter of a circle defined by the guiding support.

7. The portable electronic device as claimed in claim 5, wherein the knob is cylindrical and further comprises a circular top wall and a circumferential sidewall, the top wall has an inner surface, the top wall defines a groove in an upper part thereof, and a positioning post extends downwardly from a center of the inner surface.

8. The portable electronic device as claimed in claim 7, wherein the block and the bottom wall of the base cover cooperatively define a sliding groove therebetween, the sidewall of the knob includes an outer surface and a bottom surface, a rotating projection extends radially outwardly from the outer surface at the bottom surface, and the rotating projection is received in the sliding groove.

9. The portable electronic device as claimed in claim 8, wherein the latching projection is adjacent to the top wall, and includes a fixing incline.

10. The portable electronic device as claimed in claim 9, wherein a resisting projection is provided on the outer surface of the knob at a predetermined distance from the rotating projection, the sidewall of the knob further includes an inner surface, a resisting block is formed on the inner surface generally opposite to the resisting projection, and the resisting block resists the spring.

11. The portable electronic device as claimed in claim 10, wherein a guiding projection is provided on the bottom surface of the knob, and is movably received in the guiding groove of the base cover.

12. The portable electronic device as claimed in claim 8, wherein the sidewall of the knob defines the sliding slit and a receiving slit angular to the sliding slit, and the sliding slit spans from the resisting projection to communicate with the receiving slit.

13. The portable electronic device as claimed in claim 11, wherein the spring is a torque spring, which includes a spring body, a first fixing portion and a second fixing portion, the second fixing portion including a bent portion at a distal end thereof.

14. The portable electronic device as claimed in claim 13, wherein the spring body is located around the positioning post of the knob, the first fixing portion biases the resisting block of the knob, and the bent portion biases the securing projection of the base cover.

15. The portable electronic device as claimed in claim 1, wherein the latching hole is located in a first end portion of the removable panel.

16. The portable electronic device as claimed in claim 5, wherein the removable panel comprises an upper surface, a lower surface and a side surface, the lower surface defines a receiving groove, the receiving groove is bounded by a sidewall and a bottom wall, and the receiving groove receives a portion of the knob.

17. The portable electronic device as claimed in claim 16, wherein the sidewall at the receiving groove forms a resisting protrusion that has a resisting incline, the resisting incline corresponding to a fixing incline of the latching projection, and the bottom wall, the sidewall and the resisting protrusion at the receiving groove cooperatively define a fixing groove for receiving the latching projection.

18. The portable electronic device as claimed in claim 16, wherein the sidewall at the receiving groove defines a rotating groove corresponding to the guiding support of the base cover, and further defines a receiving aperture corresponding to the securing projection of the base cover.

19. The portable electronic device as claimed in claim 1, wherein a plurality of latches is provided on the removable panel, the base cover defines a plurality of latching slots corresponding to the latches, a plurality of catches is provided on opposite sides of the removable panel, and the base cover defines a plurality of catch slots corresponding to the catches.

20. The portable electronic device as claimed in claim 1, wherein the base cover comprises a mounting portion and an elastic plate, the elastic plate includes an elastic portion and a fixing portion, and the fixing portion is attached to the mounting portion.

21. A portable electronic device, comprising:
a base cover defining a receiving space and an engaging mechanism at one end thereof;
a latching assembly comprising a resiliently rotary knob installed in said receiving space away from said engaging mechanism; and
a removable panel receivable in said receiving space and comprising a latching hole corresponding to said knob, said panel being removably engagable with said engaging mechanism and said latching assembly respectively so as to move into said receiving space and be fixable therein via engagement of said panel with said knob after temporarily resilient rotation of said knob.

22. A portable electronic device, comprising:
a base cover defining a shallow compartment and an engaging mechanism at one end thereof;
a latching assembly comprising a rotary knob with a resilient member installed in the shallow compartment away from the engaging mechanism;
a flexible element disposed in the shallow compartment of the base cover and being adjacent to the knob; and
a panel detachably received in the shallow compartment, the panel comprising a latching hole;
wherein when the panel is pressed into the shallow compartment, the panel drives the knob to rotate in a first direction and the resilient member accumulates resilient energy, and when the panel finishes driving the knob, the resilient member rebounds to rotate the knob in a second direction opposite to the first direction, whereby the knob is engaged with the panel, the panel is engaged with the engaging mechanism, the knob is received in the latching hole, and the flexible element biases the panel; and
when the rotary knob is rotated in the first direction, the flexible element elastically drives the panel in a direction away from the shallow compartment whereby the panel is released from the engaging mechanism.

* * * * *